United States Patent
Rajput et al.

(10) Patent No.: US 11,979,369 B2
(45) Date of Patent: May 7, 2024

(54) METHODS, SYSTEMS, AND COMPUTER READABLE MEDIA FOR PROVIDING FOR OPTIMIZED SERVICE-BASED INTERFACE (SBI) COMMUNICATIONS BY PERFORMING NETWORK FUNCTION (NF) FULLY QUALIFIED DOMAIN NAME (FQDN) RESOLUTION AT NF REPOSITORY FUNCTION (NRF)

(71) Applicant: Oracle International Corporation, Redwood Shores, CA (US)

(72) Inventors: Jay Rajput, Bangalore (IN); Virendra Singh, Bangalore (IN); Amarnath Jayaramachar, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 195 days.

(21) Appl. No.: 17/481,004

(22) Filed: Sep. 21, 2021

(65) Prior Publication Data
US 2023/0090068 A1 Mar. 23, 2023

(51) Int. Cl.
*H04L 61/5076* (2022.01)
*H04L 61/4511* (2022.01)
(Continued)

(52) U.S. Cl.
CPC ...... *H04L 61/5076* (2022.05); *H04L 61/4511* (2022.05); *H04L 61/4541* (2022.05); *H04L 61/5007* (2022.05); *H04L 67/51* (2022.05)

(58) Field of Classification Search
CPC ............. H04L 61/5076; H04L 61/5007; H04L 61/4511; H04L 61/4541
See application file for complete search history.

(56) References Cited

U.S. PATENT DOCUMENTS 8,811,228 B2 8/2014 Lopez et al.
9,667,590 B2 5/2017 Yan et al.
(Continued)

FOREIGN PATENT DOCUMENTS

CN 105635345 B 2/2019
EP 4022875 A1 7/2022
(Continued)

OTHER PUBLICATIONS

Intention to Grant for European Patent Application 20 838 308.3 (dated Apr. 19, 2023).
(Continued)

*Primary Examiner* — Suraj M Joshi
(74) *Attorney, Agent, or Firm* — Jenkins, Taylor & Hunt, P.A.

(57) ABSTRACT

A method for providing for optimized service based interface (SBI) communications by performing network function (NF) fully qualified domain name (FQDN) resolution at an NF repository function (NRF) includes, at an NRF including at least one processor, receiving NF register requests including NF profiles and/or NF service profiles, at least some of which include FQDNs and do not include Internet protocol (IP) addresses. The method further includes storing the NF profiles and/or NF service profiles in an NF profiles database. The method further includes resolving the FQDNs in NF profiles and/or NF service profiles into IP addresses. The method further includes receiving NF discovery requests. The method further includes generating lists of NF profiles and/or NF service profiles that match query parameters in the NF discovery requests. The method further includes providing the lists of NF profiles and/or NF service profiles including the IP addresses to consumer NFs in NF discovery responses.

8 Claims, 9 Drawing Sheets

(51) Int. Cl.
*H04L 61/4541* (2022.01)
*H04L 61/5007* (2022.01)
*H04L 67/51* (2022.01)

(56) References Cited

U.S. PATENT DOCUMENTS

| | | | |
|---|---|---|---|
| 10,097,504 | B2 | 10/2018 | Backholm |
| 10,285,155 | B1 | 5/2019 | Dodd-Noble et al. |
| 10,609,530 | B1 | 3/2020 | Patil et al. |
| 11,082,393 | B2 | 8/2021 | Goel |
| 11,323,413 | B2 | 5/2022 | Goel |
| 2017/0187673 | A1 | 6/2017 | Kaliski, Jr. et al. |
| 2019/0036871 | A1 | 1/2019 | Lapidous et al. |
| 2019/0230556 | A1 | 7/2019 | Lee |
| 2019/0238642 | A1 | 8/2019 | Sesham et al. |
| 2019/0253461 | A1 | 8/2019 | Bykampadi et al. |
| 2019/0306251 | A1 | 10/2019 | Talebi Fard et al. |
| 2020/0007632 | A1 | 1/2020 | Landais et al. |
| 2020/0028920 | A1 | 1/2020 | Livanos et al. |
| 2020/0029197 | A1 | 1/2020 | Tandon et al. |
| 2020/0076764 | A1 | 3/2020 | Robitzsch et al. |
| 2021/0067480 | A1 | 3/2021 | Goel |
| 2021/0067485 | A1* | 3/2021 | Goel ............... H04L 61/4511 |
| 2021/0385286 | A1* | 12/2021 | Wang ............... H04L 61/4511 |
| 2022/0330004 | A1 | 10/2022 | Sood et al. |
| 2022/0417204 | A1 | 12/2022 | Rajput et al. |

FOREIGN PATENT DOCUMENTS

| | | |
|---|---|---|
| EP | 4059209 B1 | 9/2023 |
| WO | WO 2019/062596 A1 | 4/2019 |
| WO | WO 2019/076273 A1 | 4/2019 |
| WO | WO 2019/144321 A1 | 8/2019 |

OTHER PUBLICATIONS

Non-Final Office Action for U.S. Appl. No. 17/074,553 (dated Aug. 18, 2021).

Commonly-Assigned, co-pending U.S. Appl. No. 17/356,451 for "Methods, Systems, and Computer Readable Media for Resolution of Inter-Network Domain Names" (Unpublished, filed Jun. 23, 2021).

"3rd Generation Partnership Project; Technical Specification Group Core Network and Terminals; Numbering, addressing and identification; (Release 17)," 3GPP TS 23.003, V17.1.0, pp. 1-143 (Mar. 2021).

"3rd Generation Partnership Project; Technical Specification Group Core Network and Terminals; 5G System; Public Land Mobile Network (PLMN) Interconnection; Stage 3 (Release 17)," 3GPP TS 29.573, V17.0.0, pp. 1-100 (Mar. 2021).

Commonly-Assigned, co-pending Continuation-in-Part U.S. Appl. No. 17/074,553 for "Methods, Systems, and Computer Readable Media for Actively Discovering and Tracking Addresses Associated with 4G Service Endpoints," (Unpublished, filed Oct. 19, 2020).

Non-Final Office Action for U.S. Appl. No. 16/555,817 (dated Aug. 7, 2020).

"3rd Generation Partnership Project; Technical Specification Group Radio Access Network; NG-RAN; NG Application Protocol (NGAP) (Release 15)," 3GPP TS 38.413, V15.4.0, pp. 1-328 (Jul. 2019).

"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).

"3rd Generation Partnership Project; Technical Specification Group Core Network and Terminals; 5G System; Restoration Procedures (Release 16)," 3GPP TS 23.527, V16.0.0, pp. 1-19 (Jun. 2019).

"3rd Generation Partnership Project; Technical Specification Group Core Network and Terminals; Numbering, addressing and identification (Release 15)," 3GPP TS 23.003, V15.7.0, pp. 1-131 (Jun. 2019).

Penttinen, "5G Explained: Security and Deployment of Advanced Mobile Communications," Chapter 6, Section 6.3.8 NRF, 2 pages (Feb. 2019).

"Cisco Ultra 5G Packet Core Solution," Cisco, White paper, https://www.cisco.com/c/dam/en/us/products/collateral/routers/network-convergence-system-500-series-routers/white-paper-c11-740360.pdf, pp. 1-11 (2018).

Li et al., "Mobile Edge Computing Platform Deployment in 4G LTE Networks: A Middlebox Approach," https://www.usenix.org/system/files/conference/hotedge18/hotedge18-papers-li.pdf, 6 pages (2018).

Brown et al., "Service-Based Architecture for 5G Core Networks," Huawei, Heavy Reading, https://www.3g4g.co.uk/5G/5Gtech_6004_2017_11_Service-Based-Architecture-for-5G-Core-Networks_HR_Huawei.pdf, pp. 1-12 (Nov. 2017).

"3rd Generation Partnership Project; Technical Specification Group Services and System Aspects; System Architecture for the 5G System; Stage 2 (Release 15)," 3GPP TS 23.501, V1.5.0, pp. 1-170 (Nov. 2017).

Carlton et al., "HTTP and DNS in a 5G World," https://www.computerworld.com/article/3204594/http-and-dns-in-a-5g-world.html, pp. 1-5 (Jun. 30, 2017).

"3rd Generation Partnership Project; Technical Specification Group Core Network and Terminals; Domain Name System Procedures; Stage 3 (Release 13)," 3GPP TS 29.303 V13.4.0, pp. 1-69 (Jun. 2016).

Kantola et al., "Policy-based communications for 5G mobile with customer edge switching," Security and Communication Networks, vol. 9, pp. 3070-3082 (2016).

Abley et al., "A Mechanism for Remote-Triggered DNS Cache Flushes (DNS Flush)," Network Working Group, Google, pp. 1-12 (Jun. 24, 2013).

"LTE and Beyond," https://ytd2525.wordpress.com/2013/03/06/lte-and-beyond/, 3 pages (2013).

Gulbrandsen et al., "A DNS RR for specifying the location of services (DNS SRV)," RFC 2782, pp. 1-12 (Feb. 2000).

First Examination Report for Indian Patent Application Serial No. 202147053057 (dated Dec. 30, 2022).

Notice of Publication for U.S. Appl. No. 17/356,451 (dated Dec. 29, 2022).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

Mockapetris, "Domain Names—Implementation and Specification," Network Working Group, Request for Comments 1035, pp. 1-55 (Nov. 1987).

Notice of Publication for European Patent Application Serial No. 20733169.5 (dated Jun. 9, 2022).

Notice of Allowance and Fee(s) Due for U.S. Appl. No. 17/074,553 (dated Dec. 29, 2021).

Non-Final Office Action for U.S. Appl. No. 17/356,451 (dated May 25, 2023).

Decision to Grant for European Patent Application Serial No. 20838308.3 (dated Aug. 31, 2023).

Intent to Grant for European Patent Application No. 20733169.5 (dated Jun. 9, 2023).

Notice of Allowance and Fee(s) for U.S. Appl. No. 17/356,451 (Sep. 20, 2023).

Decision to Grant for European Patent Application Serial No. 20733169.5 (Oct. 19, 2023).

* cited by examiner

FIG. 9

METHODS, SYSTEMS, AND COMPUTER READABLE MEDIA FOR PROVIDING FOR OPTIMIZED SERVICE-BASED INTERFACE (SBI) COMMUNICATIONS BY PERFORMING NETWORK FUNCTION (NF) FULLY QUALIFIED DOMAIN NAME (FQDN) RESOLUTION AT NF REPOSITORY FUNCTION (NRF)

TECHNICAL FIELD

The subject matter described herein relates to improving SBI communications. More particularly, the subject matter described herein relates to methods, systems, and computer readable media for providing for optimized SBI communications by performing NF FQDN resolution at an NRF.

BACKGROUND

In 5 G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can obtain information about producer NF instances that have registered with the NRF through the NF service discovery procedure. According to the NF service discovery procedure, a consumer NF sends an NF discovery request to the NRF. The NF discovery request includes query parameters that the NRF uses to locate NF profiles of producer NFs capable of providing the service identified by the query parameters. NF profiles are data structures that define the type of service provided by a producer NF instance and well as load and overload control information regarding the producer NF instance.

In addition to consumer NFs, another type of network node that can invoke the NF service discovery procedure to obtain information about NF service instances is a service communication proxy (SCP). The case where the SCP uses the NF service discovery procedure to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances. The communications model where consumer NFs communicate with producer NFs via the SCP is referred to as the indirect communications model.

In addition to the SCP, another example of an intermediate proxy node that routes traffic between producer and consumer NFs is the security edge protection proxy (SEPP). The SEPP is the network node used to protect control plane traffic that is exchanged between different 5 G public land mobile networks (PLMNs). As such, the SEPP performs message filtering, policing and topology hiding for all application programming interface (API) messages that are transmitted between PLMNs.

One problem in 5 G communications networks that can occur during NF registration and subsequent NF discovery relates to determining the IP address of producer NFs for SBI communications. A producer NF can choose to provide an FQDN, an IP address, or both in the NF profile at the time of NF registration with the NRF. Providing IP addresses as part of the NF profile for NF registration with the NRF has operational overhead due to the changing nature of the IP addresses in the 5 G cloud native environment and the need to keep IP addresses in sync with other systems, such as the domain name system (DNS), networking routing rules, firewall rules, and others. Configuring the FQDN only in the NF profile at the time of NF registration with the NRF reduces the operational overhead at NF producers but has performance, operational, implementation, and security impacts at the NF consumer. For example, the FQDN in the NF profile needs to be resolved to an IP address using DNS queries by the consumer NF before the consumer NF can send an SBI request to the NF producer. To perform such DNS resolution, the consumer NF is required to have a DNS configuration. In addition, DNS records are continually updated, especially in cloud network environments, and the NF consumer is required to continuously update FQDN to IP address mappings. Such continuous updating is burdensome on consumer NFs. In addition, in light of the number of consumer NFs in a typical network, performing NF profile FQDN to IP address resolution by each consumer NF may burden the network with DNS traffic.

In light of these difficulties, there exists a need for improved methods, systems, and computer readable media for resolving NF FQDNs into IP addresses and providing the IP addresses to consumer NFs in a manner that does not require producer NFs to include IP addresses in NF profiles and that does not require consumer NFs to perform NF FQDN resolution.

SUMMARY

A method for providing for optimized service based interface (SBI) communications by performing network function (NF) fully qualified domain name (FQDN) resolution at an NF repository function (NRF) includes, at an NRF including at least one processor, receiving NF register requests including NF profiles and/or NF service profiles, at least some of which include FQDNs and do not include Internet protocol (IP) addresses. The method further includes storing the NF profiles and/or NF service profiles in an NF profiles database. The method further includes resolving the FQDNs in the NF profiles and/or NF service profiles into IP addresses. The method further includes receiving NF discovery requests. The method further includes generating lists of NF profiles and/or NF service profiles that match query parameters in the NF discovery requests. The method further includes providing the lists of NF profiles and/or NF service profiles including the IP addresses to consumer NFs in NF discovery responses.

According to another aspect of the subject matter described herein, resolving the FQDNs in the NF profiles includes querying, by the NRF, a domain name system (DNS) server using the FQDNs and receiving, from the DNS server, DNS responses including the IP addresses.

According to another aspect of the subject matter described herein, resolving the FQDNs includes continually updating resolutions of the FQDNs.

According to another aspect of the subject matter described herein, continually updating resolutions of the FQDNs includes reading, from the DNS responses, time to live values, determining when time intervals indicated by the time to live values are reached, and, in response to determining that a time interval is reached, re-querying the DNS server to resolve an FQDN corresponding to the time to live value whose time interval has been reached.

According to another aspect of the subject matter described herein, the DNS server is co-located with and/or integrated within the NRF.

According to another aspect of the subject matter described herein, generating lists of NF profiles and/or NF service profiles that match query parameters in the NF discovery requests includes reading, from each NF discovery request, NF type or service type identifying parameters and including, in the lists, NF profiles and/or NF service profiles having attributes that match the NF type or service type identifying parameters.

According to another aspect of the subject matter described herein, the method for providing for optimized SBI communications includes caching the IP addresses and corresponding FQDNs in a resolved FQDN cache local to the NRF.

According to another aspect of the subject matter described herein, providing the lists of NF profiles and/or NF service profiles including the IP addresses, includes identifying, in the lists of NF profiles and/or NF service profiles, NF profiles and/or NF service profiles that include FQDNs and that do not include IP addresses.

According to another aspect of the subject matter described herein, providing the lists of NF profiles and/or NF service profiles including the IP addresses to consumer NFs in NF discovery responses includes, for each of the NF profiles and/or NF service profiles in the list identified as including an FQDN and not an IP address: accessing the resolved FQDN cache using the FQDN; locating an entry in the cache corresponding to the FQDN; reading the IP address from the entry; and adding the IP address to the NF profile and/or NF service profile.

According to another aspect of the subject matter described herein, adding the IP address to the NF profile and/or the NF service profile includes adding the IP address to an ipv4Addresses or ipv6Addresses attribute of the NF profile and/or the ipEndPoints attribute of the NF service profile.

According to another aspect of the subject matter described herein, a system for providing for optimized service based interface (SBI) communications by performing network function (NF) fully qualified domain name (FQDN) resolution at an NF repository function (NRF) is provided. The system includes an NRF including at least one processor. The system further includes an NF registration handler implemented by the at least one processor for receiving NF register requests including NF profiles and/or NF service profiles, at least some of which include FQDNs and do not include Internet protocol (IP) addresses and storing the NF profiles and/or NF service profiles in an NF profiles database. The system further includes an NF FQDN resolver implemented by the at least one processor for resolving the FQDNs in the NF profiles and/or NF service profiles into IP addresses. The system further includes an NF discovery handler implemented by the at least one processor for receiving NF discovery requests, generating lists of NF profiles and/or NF service profiles that match query parameters in the NF discovery requests and providing the lists of NF profiles and/or NF service profiles including the IP addresses to consumer NFs in NF discovery responses.

According to another aspect of the subject matter described herein, the NF FQDN resolver is configured to resolve the FQDNs in the NF profiles by querying a domain name system (DNS) server using the FQDNs and receiving, from the DNS server, DNS responses including the IP addresses.

According to another aspect of the subject matter described herein, the NF FQDN resolver is configured to continually update resolutions of the FQDNs.

According to another aspect of the subject matter described herein, the NF FQDN resolver is configured to continually update the resolutions of the FQDNs by reading, from the DNS responses, time to live values, determining when time intervals indicated by the time to live values are reached, and, in response to determining that a time interval is reached, re-querying the DNS server to resolve an FQDN corresponding to the time to live value whose time interval has been reached.

According to another aspect of the subject matter described herein, the NF discovery handler is configured to generate the lists of NF profiles and/or NF service profiles that match query parameters in the NF discovery requests by reading, from each NF discovery request, NF type or service type identifying parameters and including, in the lists, NF profiles and/or NF service profiles having attributes that match the NF type or service type identifying parameters.

According to another aspect of the subject matter described herein, the NF FQDN resolver is configured to cache the IP addresses and corresponding FQDNs in a resolved FQDN cache local to the NRF.

According to another aspect of the subject matter described herein, the NF discovery handler is configured to identify, in the lists of NF profiles and/or NF service profiles, NF profiles and/or NF service profiles that include FQDNs and that do not include an IP addresses.

According to another aspect of the subject matter described herein, the NF discovery handler is configured to, for each of the NF profiles and/or NF service profiles in the list identified as including an FQDN and not an IP address: access the resolved FQDN cache using the FQDN; locate an entry in the cache corresponding to the FQDN; read the IP address from the entry; and add the IP address to the NF profile and/or NF service profile.

According to another aspect of the subject matter described herein, the NF discovery handler is configured to add the IP address to an ipv4Addresses attribute or an ipv6Addresses attribute of the NF profile or an ipEndPoints attribute of the NF service profile.

According to another aspect of the subject matter described herein, a non-transitory computer readable medium having stored thereon executable instructions that when executed by a processor of a computer control the computer to perform steps is provided. The steps are performed at a network function (NF) repository function (NRF). The steps include receiving NF register requests including NF profiles and/or NF service profiles, at least some of which include FQDNs and do not include Internet protocol (IP) addresses. The steps further include storing the NF profiles and/or NF service profiles in an NF profiles database. The steps further include resolving the FQDNs in the NF profiles and/or NF service profiles into IP addresses. The steps further include receiving NF discovery requests. The steps further include generating lists of NF profiles and/or NF service profiles that match query parameters in the NF discovery requests. The steps further include providing the lists of NF profiles and/or NF service profiles including the IP addresses to consumer NFs in NF discovery responses.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
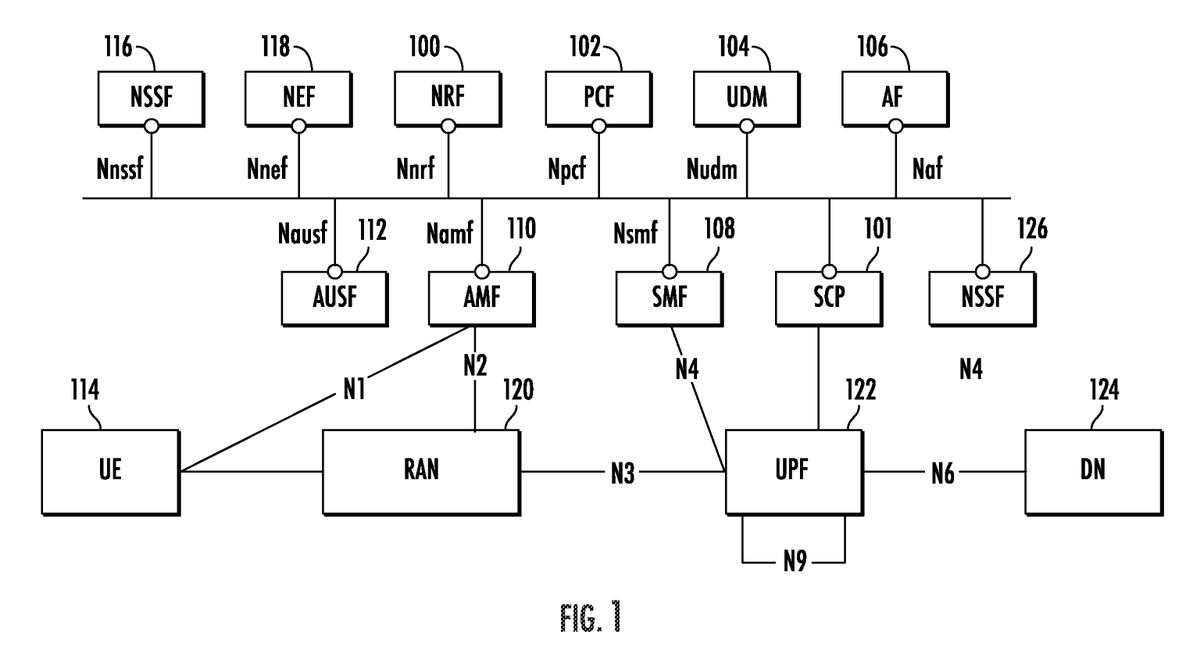
FIG. 1 is a network diagram illustrating an exemplary 5 G system network architecture.

FIG. 1 is a block diagram illustrating an exemplary 5 G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3 GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management (UDM) function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4 G networks. An authentication server function (AUSF) 112 performs authentication services for user equipments (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4 G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem that can occur in 5 G and other networks is inefficiencies relating to providing IP addresses of producer NFs to consumer NFs. Inefficiencies can occur both in cases where producer NFs register NF profiles including IP addresses and not including FQDNs and where producer NFs register NF profiles including FQDNs and not IP addresses. In the case where the NF profile includes an IP address and does not include an FQDN, manual updating of the NF profile can be required if the IP address of an NF service producer changes. In the case where an NF profile includes an FQDN and does not include an IP address, requiring consumer NFs to perform NF FQDN resolution is undesirable due to the number of consumer NFs and the requirement that each be configured with DNS querying and updating functionality.

In order to avoid these difficulties, an NRF may receive NF registrations from NF service producers where the NF profiles include FQDNs only (no IP addresses) and the NRF performs NF FQDN resolution on behalf of the consumer NFs. Performing NF FQDN resolution at the NRF is advantageous because only the NRF is required to perform the resolution, eliminating the need for DNS configurations and querying by the consumer NFs. Performing NF FQDN resolution at the NRF also enables producer NFs to register NF and service profiles with FQDNs only and avoids the need for manual updating of NF profiles when the IP address associated with an FQDN changes.

The NRF provides a variety of service operations to network functions in the 5 G network. One such service operation is the NF register service operation. The NF register service operation is defined in Section 5.2.2.2 of 3 GPP TS 29.510. The NF register service operation is used to register an NF with the NRF by providing the NF profile of the NF to the NRF, allowing the NF to be discovered by other NFs. The NF register service operation can also be used to register service is associated with an existing NF instance. The NF register service operation can further be used to register NRF information with another NRF, which can be used to forward discovery requests.

Figure 2:
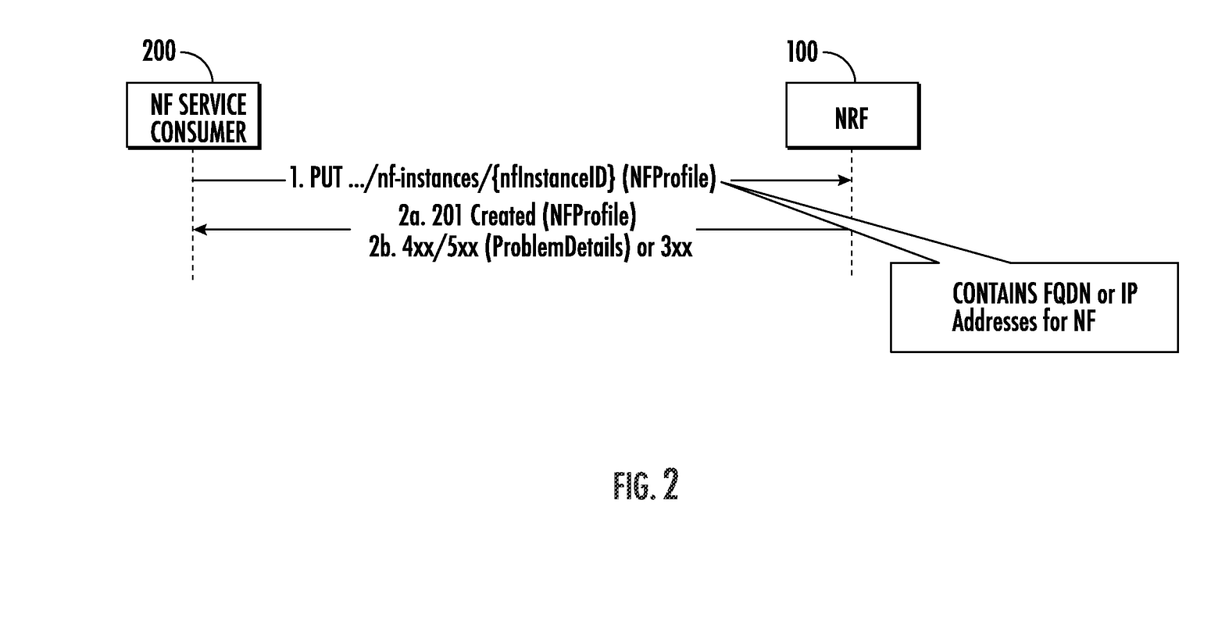
FIG. 2 is a message flow diagram illustrating exemplary messages exchanged for the NF register service operation.

FIG. 2 illustrates exemplary messages exchanged in the NF register service operation. Referring to FIG. 2, in step 1, NF service consumer 200 initiates the NF register service operation by sending and HTTP PUT message to NRF 100. NF service consumer 200 sends the HTTP PUT message to the NRF that is locally configured to serve the consumer NF. The HTTP PUT message is also referred to as an NF register message and includes the NF profile of NF service consumer 200. The NF profile can include the FQDN and/or the IP address of NF service consumer 200. In step 2a of the message flow diagram, NRF 100 responds to the HTTP PUT message with a 201 Created message if the registration was successful. In step 2b, if the registration was not successful NRF 100 responds with a 4xx or 5xx message indicating problem details. If the registration was re-directed, NRF 100 responds with a 3xx message.

Yet another service operation that is provided by the NRF is the NF discover service operation. The NF discover service operation is used to discover the set of NFs that are capable of providing a service to a given NF. The NF discover service operation is defined in Section 5.3.2.2 of 3 GPP TS 29.510. According to the service definition, the NF discover service operation discovers the set of NF instances and their associated NF service instances represented by their NF profiles that are currently registered in the NRF and that satisfy input query parameters provided by the querying NF in the NF discover request.

Figure 3:
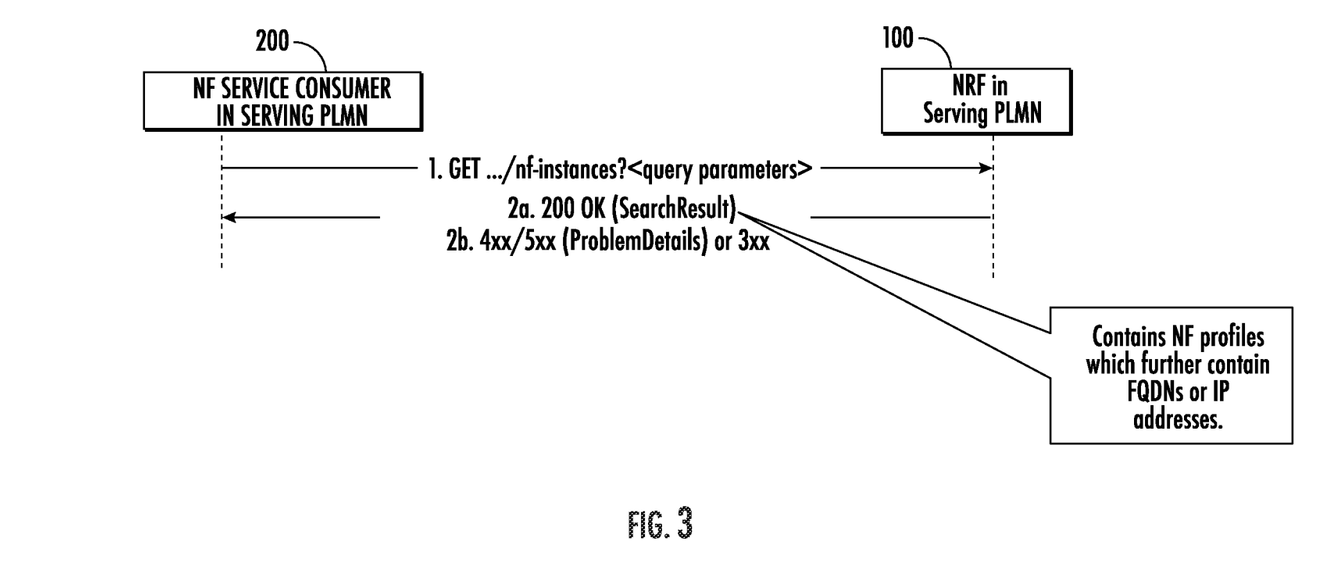
FIG. 3 is a message flow diagram illustrating exemplary messages exchanged for the NF discovery service operation.

FIG. 3 illustrates exemplary messages exchanged in the NF discover service operation. Referring to FIG. 3, and step 1, NF service consumer 200 initiates the NF discover service operation by sending an HTTP GET message to NRF 100. For NF discovery, the HTTP GET message is also referred to as an NF discover request. The HTTP GET message includes query parameters used by NRF 100 to identify the set of NF profiles to return to NF service consumer 200. If the NF discover operation is successful, NRF 100 responds as indicated by step 2a with a 200 OK message including the NF profiles of NFs that match the query parameters in the NF discover request. Each NF profile will either include the FQDN and/or the IP address of the producer NF. If the NF profile includes the FQDN and no IP address, NF service consumer 200 is required to include a DNS configuration to resolve the FQDN. If the NF profile includes an IP address and no FQDN, the IP address can change, and manual IP address configuration of the NF profile can be required. If the NF discover service operation is unsuccessful, NRF 100 may respond with a 4xx or 5xx message specifying problem details, as indicated by step 2b. If the NF discover message is redirected, NRF 100 responds with a 3xx message.

Figure 4:
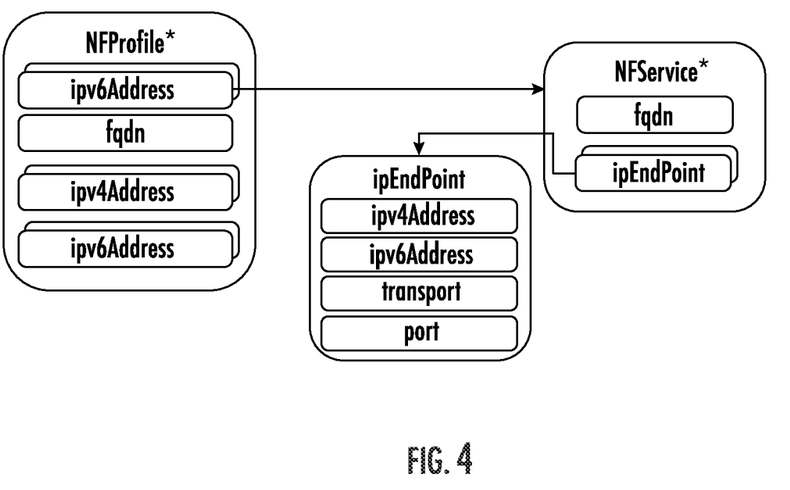
FIG. 4 is a block diagram illustrating exemplary attributes of an NF profile and an NF service profile.

The NF profile and the NF service profile are data structures defined in 3 GPP TS 29.510. FIG. 4 is a block diagram illustrating some, but not all of the attributes that may be included in an NF profile and an NF service profile. Referring to FIG. 4, the NF profile includes an FQDN attribute, an IPv4 address attribute and an IPv6address attribute. According to NOTE 1 of Table 6.1.6.2.2-1 of 3 GPP TS 29.510:

NOTE 1: At least one of the addressing parameters (fqdn, ipv4address or ipv6adress) shall be included in the NF Profile. If the NF supports the NF services with "https" URI scheme (i.e use of TLS is mandatory), then the FQDN shall be provided in the NF Profile or the NF Service profile (see clause 6.1.6.2.3) and it shall be used to construct the target URI (unless overriden by a NFService-specific FQDN). See NOTE 1 of Table 6.1.6.2.3-1 for the use of these parameters. If multiple ipv4 addresses and/or ipv6 addresses are included in the NF Profile, the NF Service Consumer of the discovery service shall select one of these addresses randomly, unless operator defined local policy of IP address selection, in order to avoid overload for a specific ipv4 address and/or ipv6 address.

According to NOTE 1, the NF profile shall include the FQDN, IP address, or both. The subject matter described herein allows producer NFs to register the FQDN only, and resolution of the FQDN is handled in an efficient manner by the NRF. NOTE 1 states that the FQDN in the NF profile can be overridden by the FQDN in the NF service profile. The NF service profile is defined in Section 6.1.6.2.3 of 3 GPP TS 29.510. The NF service profile includes an FQDN attribute that specifies the FQDN of an NF service instance. The NF service profile also includes an ipEndPoints attribute that includes an IP address of the NF where the service is listening or resides. Like the NF profile data structure, 3 GPP TS 29.510 indicates that the NF service profile may include an FQDN, an IP address, or both. For example, Note 1 of Table 6.1.6.2.3 of 3 GPP TS 29.510 states:

> NOTE 1: The NF Service Consumer will construct the API URIs of the service using: For intra-PLMN signalling: If TLS is used, the FQDN present in the NF Service Profile, if any; otherwise, the FQDN present in the NF Profile. If TLS is not used, the FQDN should be used if the NF Service Consumer uses Indirect Communication via an SCP; the FQDN or the IP address in the ipEndPoints attribute may be used if the NF Service Consumer uses Direct Communication. For inter-PLMN signalling: the interPlmnFqdn present in the NF Service Profile, if any; otherwise, the interPlmnFqdn present in the NF Profile.

As will be described in detail below, the subject matter described herein allows NF service producers to register FQDNs with their NF profiles and NF service profiles and provides an efficient mechanism at the NRF for resolving the FQDNs in NF profiles and NF service profiles.

Configuring NFs with IP addresses in their NF profiles has operational impacts on the network. For example, the IP address is required to be manually configured at the NF so that the IP address can be provided in the NF profile by the NF during NF registration with the NRF. The IP address may not be known at the time of NF profile configuration, as the IP address may be provided by an external load balancer at runtime. The IP address may change based on networking needs. More instances of NF applications may be added at runtime for increased processing capacity, causing more IP addresses to be added to an NF. The 5 GC network is defined as cloud native where IP addresses are not known and change frequently. The 5 GC network has a defined concept of network slicing, which can create more NF instances and more IP addresses to be managed. Using the FQDN as an identity for an NF is more advantageous than using an IP address because an FQDN can be used as an identity for a TLS certificate.

Figure 5:
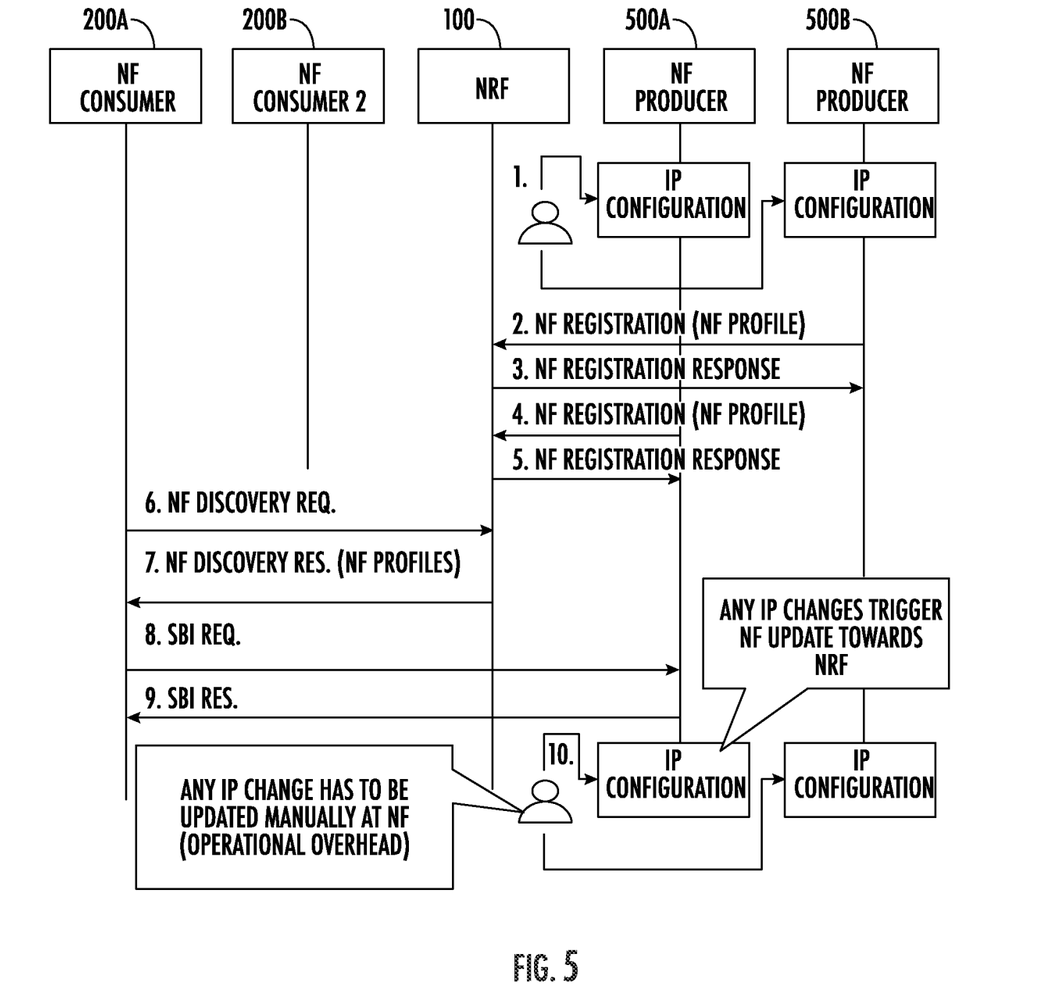
FIG. 5 is a message flow diagram illustrating exemplary messages exchanged for NF registration where NF producers use IP addresses in their NF profiles and require manual updates.

FIG. 5 is a message flow diagram illustrating exemplary messages exchanged for NF registration where NF producers use IP addresses in their NF profiles and require manual updates. Referring to FIG. 5, in step 1, a network operator manually configures IP addresses in the NF profiles of NF producers 500A and 500B. In step 2, NF producer 500B sends an NF registration message with its NF profile to NRF 100. The NF profile includes the IP address of NF producer 500B. In step 3, NRF 100 sends an NF registration response to NF producer 500B. In step 4, NF producer 500A sends an NF registration message with its NF profile to NRF 100. The NF profile includes the IP address of NF producer 500A. In step 5, NRF 100 sends an NF registration response to NF producer 500A.

In step 6, NF consumer 200A sends an NF discovery request message to NRF 100. In step 7, NRF 100 sends an NF discovery response message including NF profiles that match query parameters in the NF discovery request to NF consumer 200A. In step 8, NF consumer 200A sends an SBI request message to NF producer 500A. In step 9, NF producer 500A sends an SBI response message to NF consumer 200A.

In step 10, an IP address change occurs at NF producer 500A and NF producer 500B. The IP address change requires that the NF profiles of NF producers 500A and 500B be updated manually by the network operator. The IP address change to the IP addresses in the NF profiles requires NF updates to be sent to the NRF. Even though 3 GPP standards define a procedure for such NF updates, requiring such updates each time the IP address associated with an NF profile or an NF service profile changes can cause excessive signaling in the network.

Instead of configuring NFs with IP addresses in their NF profiles, NFs can be configured with FQDNs in their NF profiles. However, configuring NFs with FQDNs in their NF profiles in the current 3 GPP architecture requires that NF service consumers be configured with DNS capabilities to resolve the FQDNs, because such resolution is required before an NF service consumer can communicate with a producer NF over an HTTP/2 connection. Requiring DNS configuration at consumer NFs can also adversely affect the performance of consumer NFs. DNS also has known security vulnerabilities, and performing DNS resolution at consumer NFs may expose the consumer NFs to DNS-based attacks.

Complexities associated with implementing DNS at consumer NFs include having to configure consumer NFs to handle all types of DNS resource records. DNS is a complex protocol with different resource records. The different types of DNS resource records include:

A: Address record for IPv4;
AAAA: Address record for IPv6;
CNAME: Canonical name record. Alias of one name to another; and
DNAME: Delegation name record. Like a CNAME record.

One point to highlight is that implementing DNS resolution at multiple NF consumers increases the implementation complexity of the NF consumer. Implementation complexity may cause interworking issues in DNS resolution solutions provided by different vendors. Implementation complexities may also cause bugs which may impact SBI traffic at run time.

Figure 6:
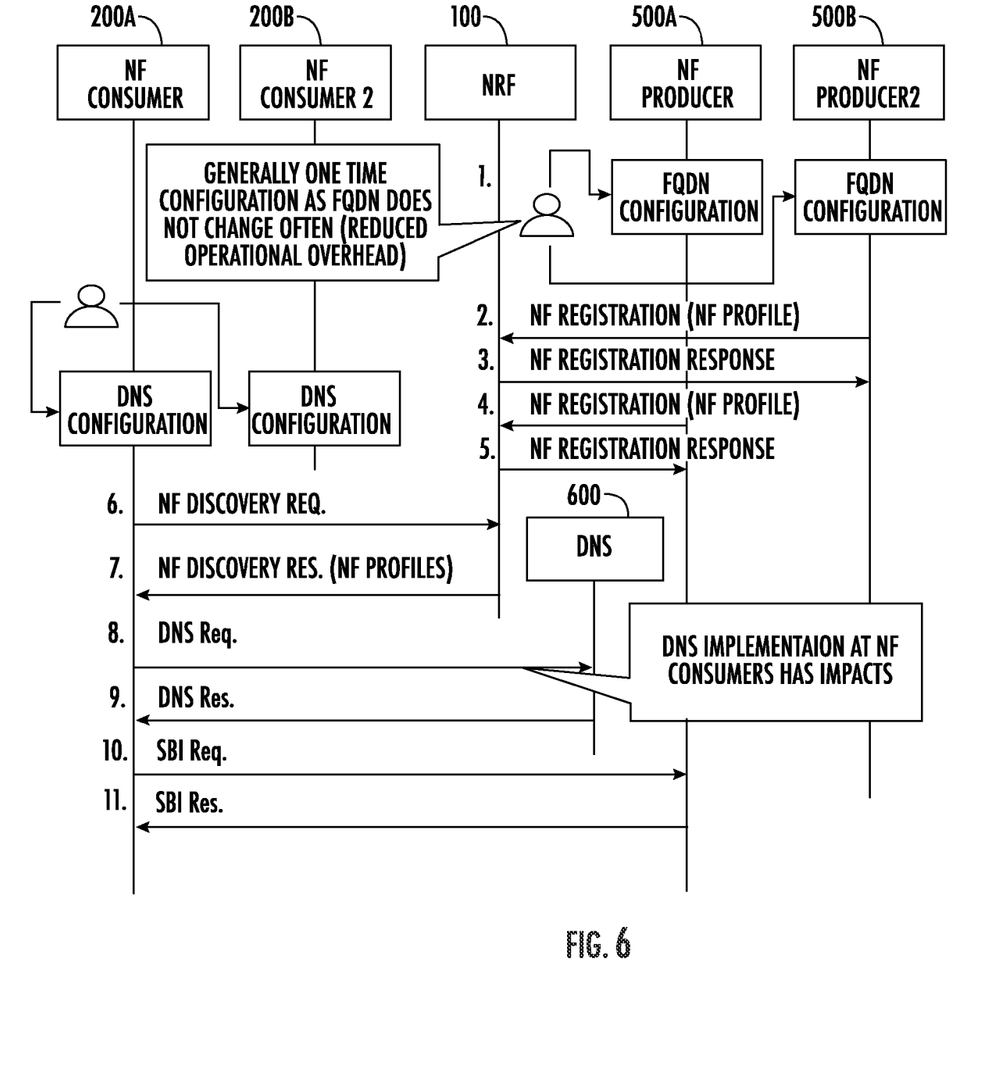
FIG. 6 is a message flow diagram illustrating exemplary messages exchanged for NF registration where the NF service producer is configured with an FQDN in its NF profile, registers the NF profile including the FQDN to NRF, and the NF consumer is required to have a DNS configuration for querying a DNS server to resolve the FQDN.

FIG. 6 is a message flow diagram illustrating exemplary messages exchanged for NF registration where the NF producer is configured with an FQDN in its NF profile instead of an IP address, the NF producer registers its NF profile including the FQDN with the NRF, and the NF consumer is required to have a DNS configuration for querying a DNS server to resolve the FQDN. Referring to FIG. 6, in step 1, a network operator manually configures FQDNs in the NF profiles of NF producers 500A and 500B. The FQDNs do not typically change as often as IP addresses, so configuring FQDNs in the NF profiles of NF producers has less operational overhead than configuring IP addresses.

In step 2, NF producer 500B sends an NF registration message with its NF profile to NRF 100. The NF profile includes the FQDN of NF producer 500B. In step 3, NRF 100 sends an NF registration response to NF producer 500B. In step 4, NF producer 500A sends an NF registration message with its NF profile to NRF 100. The NF profile includes the FQDN of NF producer 500A. In step 5, NRF 100 sends an NF registration response to NF producer 500A.

In step 6, NF consumer 200A sends an NF discovery request message to NRF 100. In step 7, NRF 100 sends an NF discovery response message including NF profiles that match query parameters in the NF discovery request to NF consumer 200A. Consumer NF 200A selects one of the NF producers to provide a requested service, and, because the NF profiles include FQDNs, in step 8, consumer NF 200A sends a DNS query to a DNS server 600. In step 9, DNS server 600 sends a DNS response including a resource record containing the IP address of NF producer 500A. In step 10, NF consumer 200A sends an SBI request message to NF producer 500A. In step 11, NF producer 500A sends an SBI response message to NF consumer 200A. As stated above, implementing DNS at the NF service consumer may have adverse performance impacts on the NF service consumer and may result in excessive DNS traffic in the network.

Figure 7:
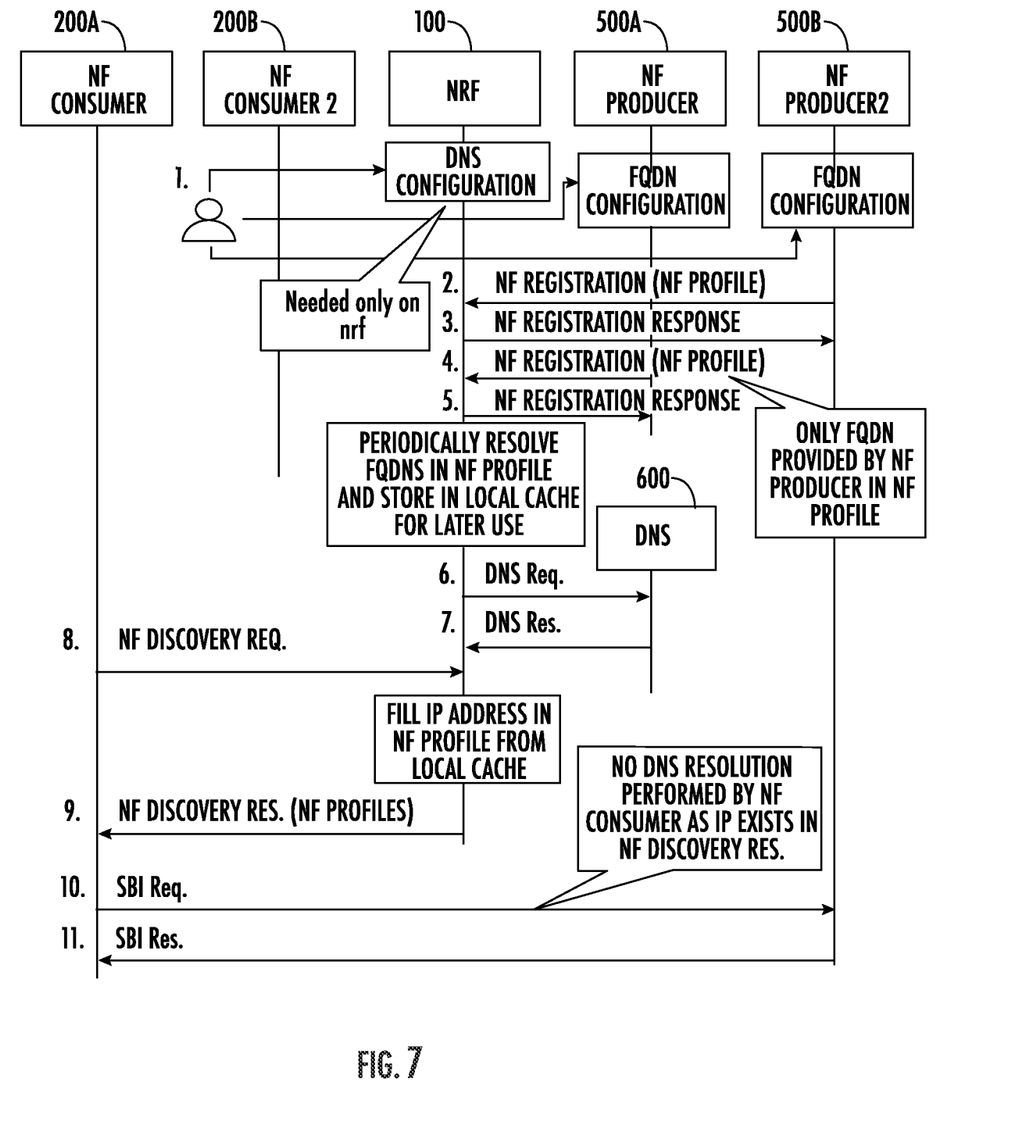
FIG. 7 is a message flow diagram illustrating exemplary messages exchanged where the producer NF is configured with an FQDN in its NF profile and registers its NF profile including the FQDN with the NRF, the NRF resolves the FQDN into an IP address, and the NRF continually resolves the FQDN and caches the IP address to be provided in NF discovery responses.

To avoid the difficulties associated with configuring NF profiles with IP addresses and with requiring DNS configuration at NF consumers, the subject matter described herein includes an NRF that allows NF producers to register NF profiles and NF service profiles with FQDNs only, continually resolves the FQDNs into IP addresses, and adds the IP addresses to NF profiles and NF service profiles being sent to producer NFs in NF discovery responses. FIG. 7 is a message flow diagram illustrating exemplary messages exchanged where the producer NF is configured with an FQDN (and no IP address) in its NF profile and registers its NF profile including the FQDN with the NRF, the NRF resolves the FQDN of the NF specified in the NF profile into an IP address, and the NRF continually resolves the FQDN and caches the IP address to be provided in NF discovery responses. Referring to FIG. 7, in step 1, the process includes configuring producer NFs 500A and 500B with FQDNs and no IP addresses in their NF profiles and/or NF service profiles and configuring NRF 100 to implement DNS. Specifically, NRF 100 is configured to function as a DNS client which continually resolves FQDNs received in NF profiles and NF service profiles from producer NFs that do not include IP addresses and caches the IP addresses. In step 2, NF producer 500B sends an NF registration message with its NF profile to NRF 100. The NF profile includes the FQDN of NF producer 500B and, in this example, does not include an IP address of NF producer 500B. In step 3, NRF 100 sends an NF registration response to NF producer 500B. In step 4, NF producer 500A sends an NF registration message with its NF profile to NRF 100. The NF profile includes the FQDN of NF producer 500A and, in this example, does not include an IP address of NF producer 500A. In step 5, NRF 100 sends an NF registration response to NF producer 500A.

In step 6, NRF 100 sends a DNS query to DNS server 600. In step 7, DNS server 600 sends a DNS response including a resource record containing the IP address of NF producer 500A. NRF 100 may perform the same steps to resolve the FQDN of NF producer 500B. NRF 100 may continually resolve all FQDNs in NF and service profiles for NFs registered with NRF 100 that do not include IP addresses. The frequency with which NRF 100 resolves the FQDNs may be controlled by the time to live (TTL) values returned in DNS resource records returned by DNS server 600. According to IETF RFC 1035, the TTL value defines a time interval that a resource record can be cached after which the source of the resource record should be re-checked. When the time to live for a DNS resource record associated with an FQDN is reached or exceeded, NRF 100 may resolve the FQDN by re-querying the DNS server and receive a new resource record with a new time to live value. NRF 100 may cache mappings between each resolved FQDN and its associated IP address.

In step 8, NF consumer 200A sends an NF discovery request message to NRF 100. NRF 100 receives the NF discovery request and identifies NF and service profiles of producer NFs that match query parameters in the NF discovery request. NRF 100 generates an NF discovery response that includes the matching NF profiles and NF service profiles. NRF 100 identifies, from the list, the NF profiles and NF service profiles that include FQDNs and that do not include IP addresses. For the NF profiles and NF service profiles that include FQDNs and that do not include IP addresses, NRF 100 accesses the cache including the mappings between FQDNs and IP addresses, reads, from the cache, the IP addresses corresponding to the FQDNs in the NF profiles, and adds the IP addresses to the NF profiles. In step 9, NRF 100 sends an NF discovery response message including NF profiles and NF service profiles that match the query parameters in the NF discovery request to NF consumer 200A.

In step 10, NF consumer 200A selects one of the producer NFs to provide a service, which in this example, is NF producer 500A, and sends an SBI request message to NF producer 500A. Because the NF profile already includes an IP address of NF producer 500A, NF consumer 200A is not required to implement DNS to resolve the FQDN in the NF profile. In step 11, NF producer 500A sends an SBI response message to NF consumer 200A.

Figure 8:
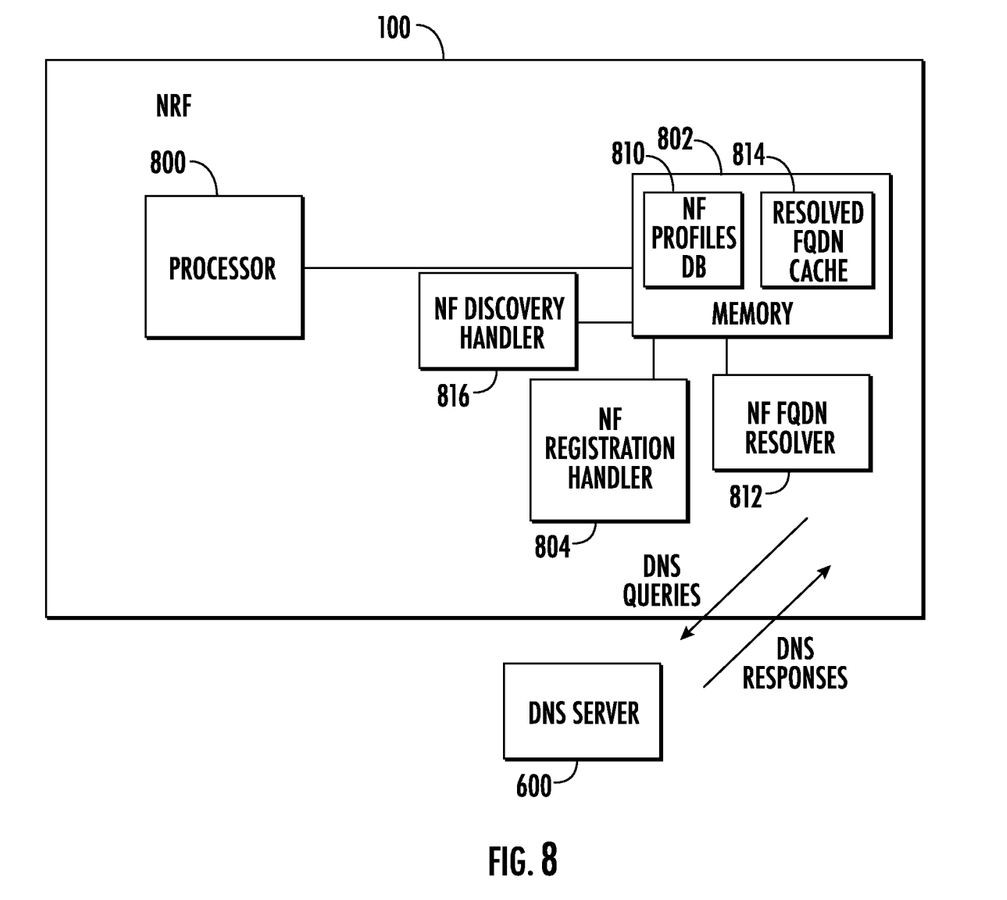
FIG. 8 is a block diagram illustrating an exemplary NRF for performing NF FQDN resolution, caching IP addresses returned from DNS, and using the IP addresses from the cache in NF discovery responses.

FIG. 8 is a block diagram illustrating an exemplary internal architecture for an NRF 100 that performs NF FQDN resolution, caches IP addresses returned from DNS, and uses the IP addresses from the cache in NF discovery responses. Referring to FIG. 8, NRF 100 includes at least one processor 800 and memory 802. NRF 100 further includes an NF registration handler 804, an NF FQDN resolver 806, and an NF discovery handler 808. NF registration handler 804 receives, from NFs, NF register messages (requests) and processes the requests to register NF profiles and NF service profiles of registering NFs in and NF profiles database 810. NF FQDN resolver 812 reads the NF profiles and NF service profiles in NF profiles database 810, identifies NF profiles and NF service profiles that have FQDNs and that do not have IP addresses, queries DNS server 600 to resolve the FQDNs into IP addresses, and stores the IP addresses and corresponding FQDNs in a resolved FQDN cache 814, which may reside in memory 802. DNS server 600 may perform DNS server operations, for example as described in IETF RFC 1035. These operations include responding to DNS requests from clients with resource records that correspond to the FQDNs received in NF queries from NF FQDN resolver 812. NF FQDN resolver 812 may perform the functions defined in IETF RFC 1035 for a DNS client. These functions include generating DNS queries formatted according to RFC 1035, transmitting the queries to DNS server 600, receiving the responses from DNS server 600, and extracting DNS data from the responses.

NF discovery handler 816 receives NF discovery requests from consumer NFs, accesses NF profiles database 810 to identify NF profiles and NF service profiles of NFs matching query parameters in the NF discovery requests, determines which NF profiles and NF service profiles are configured with FQDNs and without IP addresses, and, for those profiles, accesses resolved FQDN cache 814 to obtain IP addresses, adds the IP addresses to the NF profiles and the NF service profiles, and forwards the NF profiles and the NF service profiles to the consumer NFs in NF discovery responses. NF registration handler 804, NF FQDN resolver 812, and NF discovery handler 816 may be implemented using computer executable instructions residing in memory 802 and executed by processor 800.

Figure 9:
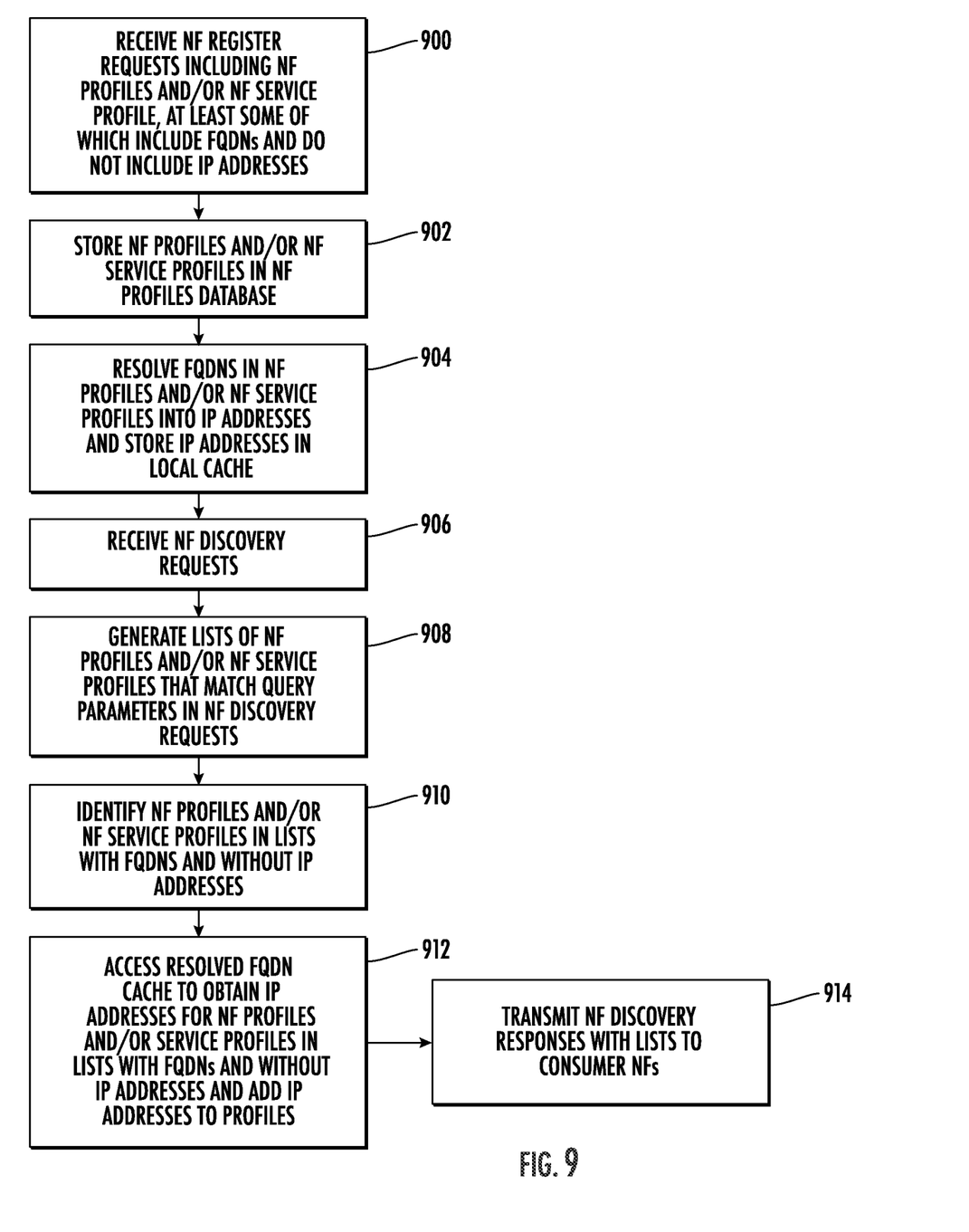
FIG. 9 is a flow chart illustrating an exemplary process performed by an NRF for performing NF FQDN resolution, caching IP addresses returned from
DNS, and using the IP addresses from the cache in NF discovery responses.

FIG. 9 is a flow chart illustrating exemplary steps implemented by NRF 100 for providing for enhanced SBI communications by performing NF FQDN resolution, caching IP addresses returned from DNS, and using the IP addresses from the cache in NF discovery responses. Referring to FIG. 9, in step 900, the process includes receiving NF register requests including NF profiles and/or NF service profiles, at least some of which include FQDNs and do not include Internet protocol (IP) addresses. For example, NRF 100 may receive NF register requests from NFs configured with FQDNs in their respective NF profiles and NF service profiles but without IP addresses in the NF profiles and NF service profiles. That is, at least some of the received NF profiles and NF service profiles may include FQDN attributes with FQDNs of the NF service producers configured by the network operator, but the NF profiles may not include ipv4Addresses or ipv6Addresses attributes configured with IP address values or the NF service profiles may not include ipEndPoints attributes configured with IP address values. It is understood that NRF 100 may also receive NF profiles and NF service profiles that include IP addresses and no FQDNs and NF profiles and NF service profiles that include IP addresses and FQDNs.

In step 902, the process includes storing the NF profiles and/or the NF service profiles in an NF profiles database. For example, NRF 100 may store NF profiles and NF service profiles received in NF register requests in NF profiles database 810.

In step 904, the process includes resolving the FQDNs in the NF profiles and NF service profiles into IP addresses and storing the IP addresses in a local cache. For example, NF FQDN resolver 812 of NRF 100 may identify NF profiles and NF service profiles that include FQDNs and not IP addresses, and, for those profiles, query a DNS server for each unresolved FQDN, obtain responses from the DNS server including resource records having IP addresses corresponding to the FQDNs in the DNS queries, and store the IP addresses and corresponding FQDNs in resolved FQDN cache 814 local to NRF 100. NF FQDN resolver 812 of NRF 100 may also store TTL values from the DNS resource records for use in determining when to update the records maintained in resolved FQDN cache 814.

In step 906, the process includes receiving NF discovery requests. For example, NF discover handler 186 of NRF 100 may receive NF discovery requests from consumer NFs. The NF discovery request may include query parameters, such as NF type identifying and NF service type identifying parameters that are usable to identify NF profiles and NF service profiles of producer NFs capable of providing a service to the requesting consumer NF.

In step 908, the process includes generating lists of NF profiles and/or NF service profiles that match query parameters in the NF discovery requests. For example, NF discovery handler 816 of NRF 100 may read, from each NF discovery request, NF type or service type identifying parameters and include, in the lists, NF profiles and/or NF service profiles having attributes that match the NF type or service type identifying parameters.

In step 910, the process includes identifying NF profiles and/or NF service profiles in the lists that include FQDNs and that do not include IP addresses. For example, after creating the list of NF profiles and/or NF service profiles that match the query parameters in an NF discovery request, NF discovery handler 816 may identify, from the NF and/or NF service profiles in the lists, those that include FQDN attributes but do not include ipv4Addresses, ipv6Addresses, and or ipEndPoints attributes.

In step 912, the process includes accessing the resolved FQDN cache to obtain IP addresses for the NF profiles and/or NF service profiles in the lists identified as having FQDNs and not IP addresses and adding the IP addresses to the NF profiles and/or NF service profiles. For example, NF discovery handler 816 may access resolved FQDN cache 814 using the FQDNs obtained from the NF profiles and/or NF service profiles identified as having FQDNs and as not having IP addresses, read corresponding IP address values from FQDN cache 814, and add the IP addresses to ipv4Addresses attributes or ipv6Addresses attributes of the NF profiles or ipEndPoints attributes of the NF service profiles.

In step 914, the process includes transmitting the lists of NF profiles and/or NF service profiles including the IP addresses to consumer NFs in NF discovery responses. For example, NF discovery handler 816 may transmit the list of NF profiles and/or NF service profiles with the resolved FQDNs to the consumer NFs that originated the NF discovery responses.

Exemplary advantages of the subject matter described herein include a reduction in operational overhead for a network operator, because IP addresses do not need to be configured for NF producers, and NF consumers do not need to be configured with DNS capabilities. The NRF is better able to handle DNS queries than NF service consumers. It is also more efficient to have the NRF resolve FQDNs on behalf of NF service consumers than to have multiple NF service consumers sending DNS queries to resolve the same FQDNs. The NRF is also better equipped than NF service consumers to cache DNS query results as the NRF is managing requests from multiple NF consumers. Performing FQDN resolution at the NRF also improves security over performing FQDN resolution at the NF consumers because security audits relating to DNS only need to be performed on the NRF, rather than on all of the NF service consumers. Performing FQDN resolution on the NRF also reduces the attack surface for DNS attacks over implementations where NF service consumers individually perform DNS resolution.

In the example illustrated in FIG. 8, DNS server 600 is external to NRF 100. In an alternate implementation, DNS server 600 may be co-located with and/or integrated within NRF 100. Providing a DNS server that is co-located with and/or integrated within NRF 100 further increases the efficiency of the implementation described herein, because the network impact of DNS query traffic is reduced. Implementation complexities are also reduced by co-locating the DNS server with the NRF—only the NRF is required to perform DNS queries. Security is also improved by a co-located solution because the likelihood of DNS response interception and modification are reduced.

The disclosure of each of the following references is hereby incorporated herein by reference in its entirety.

References 1. 3$^{rd}$ Generation Partnership Project; Technical Specification Group Core Network and Terminals; 5 G System; Network Function Repository Services; Stage 3 (Release 17) 3 GPP TS 29.510 V17.1.0 (2021-03).

2. Mockapetris, P., "Domain Names—Implementation and Specification,"

Internet Engineering Task Force (IETF) Request for Comments (RFC) 1035 (November 1987).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing for optimized service based interface (SBI) communications by performing network function (NF) fully qualified domain name (FQDN) resolution at an NF repository function (NRF), the method comprising:

at an NRF including at least one processor:

receiving NF register requests including NF profiles and/or NF service profiles, at least some of which include FQDNs and do not include Internet protocol (IP) addresses;

storing the NF profiles and/or NF service profiles in an NF profiles database;

resolving the FQDNs in the NF profiles and/or NF service profiles into IP addresses, wherein resolving the FQDNs includes, after receiving the NF register requests and prior to receiving NF discovery requests for the NF profiles and/or NF service profiles that include FQDNs and that do not include IP addresses, querying a DNS server using the FQDNs in the NF and/or NF service profiles that include the FQDNs and that do not include IP addresses, receiving responses from the DNS server including the IP addresses, and storing mappings between the FQDNs and the IP addresses in a resolved FQDN cache local to and maintained by the NRF and separate from the NF profiles database;

receiving the NF discovery requests;

retrieving, from the NF profiles database, NF profiles and/or NF service profiles that match query parameters in the NF discovery requests; and providing the NF profiles and/or NF service profiles including the IP addresses to consumer NFs in NF discovery responses, wherein providing the NF profiles and/or NF service profiles including the IP addresses comprises accessing the resolved FQDN cache using the FQDNs, extracting the IP addresses from the resolved FQDN cache, adding the IP addresses to the NF profiles and/or the NF service profiles, and transmitting the NF profiles and/or NF service profiles to the consumer NFs, wherein resolving the FQDNs includes continually updating resolutions of the FQDNs by reading, from the responses from the DNS server, time to live values, determining when time intervals indicated by the time to live values are reached, and, in response to determining that a time interval is reached, re-querying the DNS server to resolve an FQDN corresponding to the time to live value whose time interval has been reached.

2. The method of claim 1 wherein the DNS server is co-located with and/or integrated within the NRF.

3. The method of claim 1 wherein retrieving the NF profiles and/or NF service profiles that match query parameters in the NF discovery requests includes reading, from each NF discovery request, NF type or service type identifying parameters and retrieving NF profiles and/or NF service profiles having attributes that match the NF type or service type identifying parameters.

4. The method of claim 1 wherein the adding the IP addresses to the NF profiles and/or the NF service profiles includes adding the IP addresses to an ipv4Addresses or an ipv6Addresses attribute of the NF profiles or an ipEndPoints attribute of the NF service profiles.

5. A system for providing for optimized service based interface (SBI) communications by performing network function (NF) fully qualified domain name (FQDN) resolution at an NF repository function (NRF), the system comprising:

an NRF including at least one processor;

an NF registration handler implemented by the at least one processor for receiving NF register requests including NF profiles and/or NF service profiles, at least some of which include FQDNs and do not include Internet protocol (IP) addresses and storing the NF profiles and/or NF service profiles in an NF profiles database;

an NF FQDN resolver implemented by the at least one processor for resolving the FQDNs in the NF profiles and/or NF service profiles into IP addresses, wherein resolving the FQDNs includes, after receiving the NF register requests and prior to receiving NF discovery requests for the NF profiles and/or NF service profiles that include FQDNs and that do not include IP addresses, querying a DNS server using the FQDNs in the NF and/or NF service profiles that include the FQDNs and that do not include IP addresses, receiving responses from the DNS server including the IP addresses, and storing mappings between the FQDNs and the IP addresses in a resolved FQDN cache local to and maintained by the NRF and separate from the NF profiles database;

an NF discovery handler implemented by the at least one processor for receiving the NF discovery requests, retrieving, from the NF profiles database, NF profiles and/or NF service profiles that match query parameters in the NF discovery requests and providing the NF profiles and/or NF service profiles including the IP addresses to consumer NFs in NF discovery responses, wherein providing the NF profiles and/or NF service profiles including the IP addresses comprises accessing the resolved FQDN cache using the FQDNs, extracting the IP addresses from the resolved FQDN cache, adding the IP addresses to the NF profiles and/or the NF service profiles, and transmitting the NF profiles and/or NF service profiles to the consumer NFs, wherein the NF FQDN resolver is configured to continually update resolutions of the FQDNs by reading, from the responses from the DNS server, time to live values, determining when time intervals indicated by the time to live values are reached, and, in response to determining that a time interval is reached, re-querying the DNS server to resolve an FQDN corresponding to the time to live value whose time interval has been reached.

6. The system of claim 5 wherein the NF discovery handler is configured to retrieve the NF profiles and/or NF service profiles that match query parameters in the NF discovery requests by reading, from each NF discovery request, NF type or service type identifying parameters retrieve NF profiles and/or NF service profiles having attributes that match the NF type or service type identifying parameters.

7. The system of claim 5 wherein the NF discovery handler is configured to add the IP addresses to an ipv4Addresses attribute or an ipv6Addresses attribute of the NF profiles or an ipEndPoints attribute of the NF service profiles.

8. A non-transitory computer readable medium having stored thereon executable instructions that when executed by a processor of a computer control the computer to perform steps comprising:

at a network function (NF) repository function (NRF):

receiving NF register requests including NF profiles and/or NF service profiles, at least some of which include FQDNs and do not include Internet protocol (IP) addresses;

storing the NF profiles and/or NF service profiles in an NF profiles database;

resolving the FQDNs in the NF profiles and/or NF service profiles into IP addresses, wherein resolving the FQDNs includes, after receiving the NF register requests and prior to receiving NF discovery requests for the NF profiles and/or NF service profiles that include FQDNs and that do not include IP addresses, querying a DNS server using the FQDNs in the NF and/or NF service profiles that include the FQDNs and that do not include IP addresses, receiving responses from the DNS server including the IP addresses, and storing mappings between the FQDNs and the IP addresses in a resolved FQDN cache local to and maintained by the NRF and separate from the NF profiles database;

receiving NF discovery requests;

retrieving, from the NF profiles database, NF profiles and/or NF service profiles that match query parameters in the NF discovery requests; and providing the NF profiles and/or NF service profiles including the IP addresses to consumer NFs in NF discovery responses, wherein providing the NF profiles and/or NF service profiles including the IP addresses comprises accessing the resolved FQDN cache using the FQDNs, extracting the IP addresses from the resolved FQDN cache, adding the IP addresses to the NF profiles and/or the NF service profiles, and transmitting the NF profiles and/or NF service profiles to the consumer NFs, wherein resolving the FQDNs includes continually updating resolutions of the FQDNs by reading, from the responses from the DNS server, time to live values, determining when time intervals indicated by the time to live values are reached, and, in response to determining that a time interval is reached, re-querying the DNS server to resolve an FQDN corresponding to the time to live value whose time interval has been reached.

* * * * *

UNITED STATES PATENT AND TRADEMARK OFFICE
CERTIFICATE OF CORRECTION

PATENT NO. : 11,979,369 B2
APPLICATION NO. : 17/481004
DATED : May 7, 2024
INVENTOR(S) : Rajput et al.

It is certified that error appears in the above-identified patent and that said Letters Patent is hereby corrected as shown below:

In the Drawings

On sheet 6 of 9, in FIG. 6, and on the title page, the illustrative print figure, Line 3, under 500B delete "PRODUCER2" and insert -- PRODUCER 2 --, therefor.

On sheet 6 of 9, in FIG. 6, and on the title page, the illustrative print figure, Line 14, delete "IMPLEMENTAION" and insert -- IMPLEMENTATION --, therefor.

In the Specification

In Column 6, Lines 4-5, delete "DNS, and using the IP addresses from the cache in NF discovery responses." and insert the same on Column 6, Line 3, as a continuation of the same paragraph, therefor.

In Column 8, Line 37, delete "IPv6address" and insert -- IPv6 address --, therefor.

In Column 8, Line 41, delete "ipv6adress)" and insert -- ipv6address) --, therefor.

In Column 8, Line 46, delete "overriden" and insert -- overridden --, therefor.

In Column 8, Line 47, delete "NFService" and insert -- NF Service --, therefor.

In Column 14, Lines 55-56, delete "Internet Engineering Task Force (IETF) Request for Comments (RFC) 1035 (November 1987)." and insert the same on Column 14, Line 54, as a continuation of the same paragraph, therefor.

In the Claims

In Column 16, Line 57, delete "parameters" and insert -- parameters; and --, therefor.

Signed and Sealed this
Twenty-fourth Day of September, 2024

Katherine Kelly Vidal
*Director of the United States Patent and Trademark Office*